July 7, 1970 S. R. TOMES 3,519,095

PRECISION ELECTROMAGNETIC BALANCE

Filed Aug. 1, 1969 4 Sheets-Sheet 1

INVENTOR
SIDNEY R. TOMES
BY
ATTORNEYS

July 7, 1970  S. R. TOMES  3,519,095
PRECISION ELECTROMAGNETIC BALANCE
Filed Aug. 1, 1969  4 Sheets-Sheet 2

INVENTOR
SIDNEY R. TOMES
BY
ATTORNEYS.

INVENTOR
SIDNEY R. TOMES
ATTORNEYS

July 7, 1970      S. R. TOMES      3,519,095

PRECISION ELECTROMAGNETIC BALANCE

Filed Aug. 1, 1969      4 Sheets-Sheet 4

INVENTOR
SIDNEY R. TOMES
BY
ATTORNEYS

United States Patent Office 3,519,095
Patented July 7, 1970

3,519,095
PRECISION ELECTROMAGNETIC BALANCE
Sidney R. Tomes, Mount Vernon, N.Y., assignor to Artek Systems Corporation, Farmingdale, N.Y., a corporation of New York
Filed Aug. 1, 1969, Ser. No. 846,820
Int. Cl. G01g 7/04
U.S. Cl. 177—210
32 Claims

ABSTRACT OF THE DISCLOSURE

An electromagnetic balance including a spindle supporting a weighing pan. The spindle is held vertically in essentially frictionless vertical bearings that extend over a spindle span of at least two inches and is functionally unitary with a position sensor that generates an electric signal as a function of vertical displacement of the spindle. This signal is fed to an electronic amplifier, the output of which energizes a multiturn force coil wound on a former fixed to the spindle and operating in a high flux magnetic field, the coil and field forming a linear magnetic vertically acting force system that supplies a lifting force to the spindle to counteract the weight of the spindle, the weighing pan and the material on the weighing pan whose weight is to be ascertained. The spindle is movable over a range small enough so that in its operative mode the coil always cuts the same number of lines of force whereby to obtain linear action. Due to the high gain of the amplifier and force system, the movement of the spindle over its designed range is quite small, typically not exceeding 0.01" for a weight of about 1500 grams.

BACKGROUND OF THE INVENTION

Field of the invention

A nonnulling displacement type precision electromagnetic balance which utilizes a position sensor, the output of which through high gain means enables a small displacement of the object being weighed to apply a counterbalancing force to a vertical spindle that supports a weighing pan.

Description of the prior art

Electromagnetic weighing balances have heretofore been subject to various structural drawbacks which imparted mechanical hysteresis that lessened the accuracy of read-out. For example, the weighing systems sometimes included an appreciable spring constant that disturbed the accuracy of readings; or they included levels or beams supported on knife edges, this likewise, deleteriously affecting reading accuracy. Other systems required substantial vertical displacements which resulted in the need for appreciable damping that caused extended oscillations or too extended a critical period for damping. Still further systems employed nonlinear forces for counteracting the weight to be measured so that it was difficult to obtain inexpensive read-outs such as a digital read-out, or an analogue scale was required for read-out. Additional previous systems were defective in that they were of the nulling type which required restoration of the weighing systems to a starting position, thus introducing further errors caused by the sensing mechanism that determined the restoration of the starting position and by the servo loop that was used as a follow-up.

SUMMARY OF THE INVENTION

The present invention overcomes the various defects of the prior art and provides a weighing system which is subject to none of its drawbacks. This invention is designed to fill the need for a precision balance capable of giving digital read-out in negligible weighing times of, e.g., one or two seconds. As noted above, commercial electroydnamic instruments using an electric counter balancing coil are available, but major structural, magnetic and electronic differences exist between previous instruments and the instrument of the within invention.

In the present invention the counteracting force which is applied along a vertical line to a vertical spindle that supports a weighing pan is derived from an electrical coil operating in a high flux magnetic gap, the coil and gap resembling a moving coil loudspeaker. Such an arrangement creates a linear magnetic system so that for any given coil and magnetic structure the force output is exactly proportional to the current in the coil and, when once established, a read-out of coil current can be converted directly to a reading of weight. In operation of the balance either the coil or the gap is longer in the direction of relative movement of the two, so that over the full range of displacement of the spindle during weighing the coil always cuts the same number of lines of force. By employing a closed electromechanical loop, i.e. feedback system, in which the coil current is automatically controlled to obtain equilibrium, a direct reading of either the analogue or digital type can be secured. To obtain the high accuracy of the system it is necessary for the coil to operate in an essentially constant magnetic flux, that is to say, constant within the prescribed range of acceptable error. This obviates the necessity of using a null system that has zero displacement at the time of read-out.

The foregoing operation is obtained by suitably relating the length of the coil to the length of the dimension of the magnetic gap parallel to the line of relative movement of the coil and gap, for example, by having the axial length of the coil less than the axial length of the gap plus the maximum range of movement. This maximum movement of the coil, i.e. its movement from a position of minimum weight to a position of maximum weight, must be small enough so that there always is a full overlap of the shorter of the gap or the coil. Phrased differently, if the coil is shorter than the gap, then it must be sufficiently shorter so that the coil length plus the amount of maximum spindle movement does not exceed in length the length of the gap, and if the gap is shorter, then the length of the gap plus the distance of maximum spindle movement must be shorter than the length of the coil.

With this arrangement electrical measurements can be made to a very high order of accuracy at a very reasonable cost so that the system's accuracy is predominantly determined by the accuracy of the suspension system.

The two major causes of concern that effect accuracy are, firstly, friction, that is to say, mechanical hysteresis, and, secondly, any forces other than that obtained from the coil and which would affect linearity of movement of the coil.

The effect of friction is quite obvious and, in accordance with the invention as hereinafter described, is made negligible. Very small external forces will introduce nonlinearity unless the system always returns to exactly the same position regardless of the weight of the sample or is a perfect null sensing system. By making the maximum movement of the system small, for example, 0.003", for the total weight range and utilizing a high gain amplifier/force system, i.e., one which provides a large force for a small vertical movement of the weight, such system including a coil having a high change of ampere turns for a small displacement, and by making all compliances very high, for example, using very lightweight leads to the force coil, a desired accuracy of one part in 15,000 is easily obtained. Typically, a high gain amplifier/force system provides the maximum force change required, i.e. desired, for a movement not exceeding the order of 0.01".

The present invention uses a considerable degree of sophistication, as will be appreciated hereinafter, for reducing the static friction of the support system for the spindle to a point where the mechanical hysteresis is less than 0.03 gram for a balance operating in the 0–1500 gram range, and such support systems are features of the present invention. These support systems are essentially frictionless.

It is an object of the present invention to provide an accurate electromagnetic balance accomplishing all of the foregoing desiderata.

It is another object of the invention to provide a balance of the character described which constitutes relatively few and simple parts, is easy to operate, is rugged and reliable and which can be made at a low cost.

It is another object of the invention to provide a balance of the character described which is compact in construction, can be readily carried about and is delicate in neither its construction nor its setup.

Other objects of the invention in part will be obvious and in part will be pointed out hereinafter.

The invention accordingly consists in the features of construction, combinations of elements and arrangements of parts which will be exemplified in the balances hereinafter described and of which the scope of application will be indicated in the appended claims.

BRIEF DESCRIPTION OF THE DRAWINGS

In the accompanying drawings, in which are shown various possible embodiments of the invention.

DESCRIPTION OF THE PREFERRED EMBODIMENTS

Figure 1:
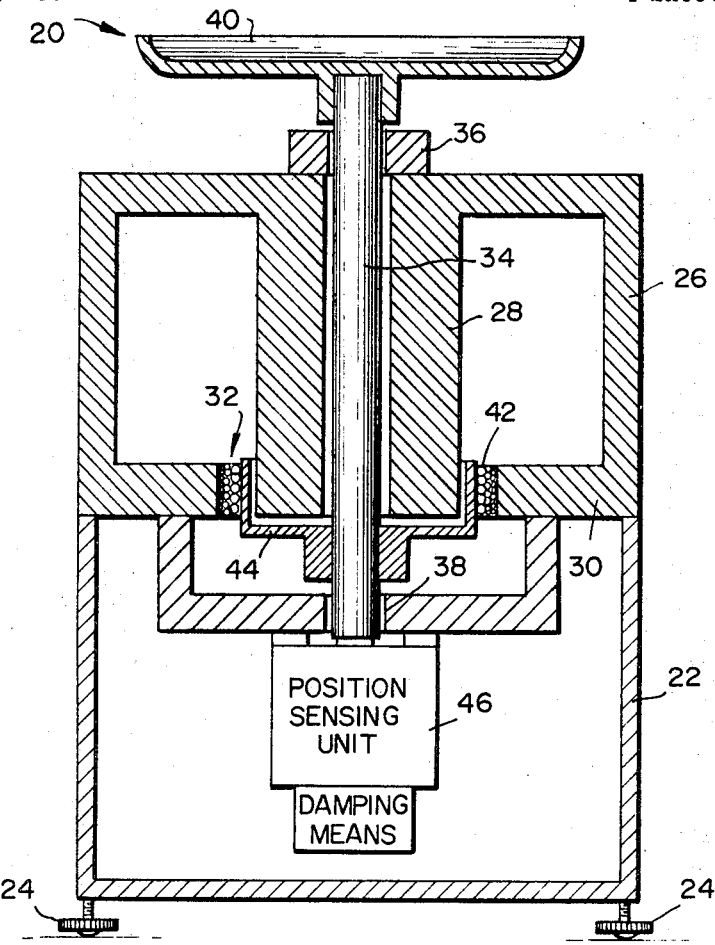
FIG. 1 is a vertical central sectional view, partially schematic, of a balance embodying the present invention.
Figure 2:
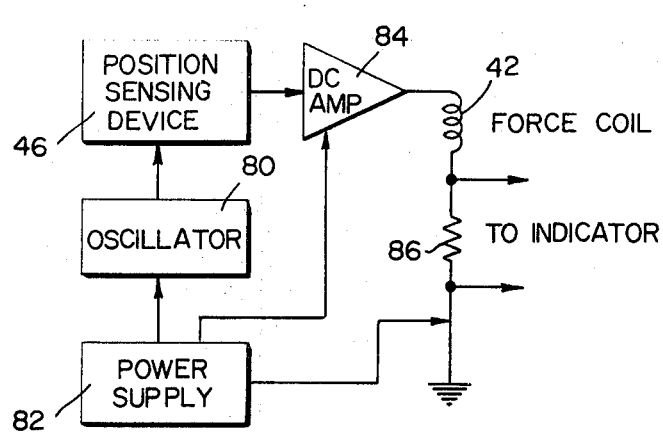
FIG. 2 is a schematic diagram of the electronic circuit of the balance shown in FIG. 1.
Figure 12:
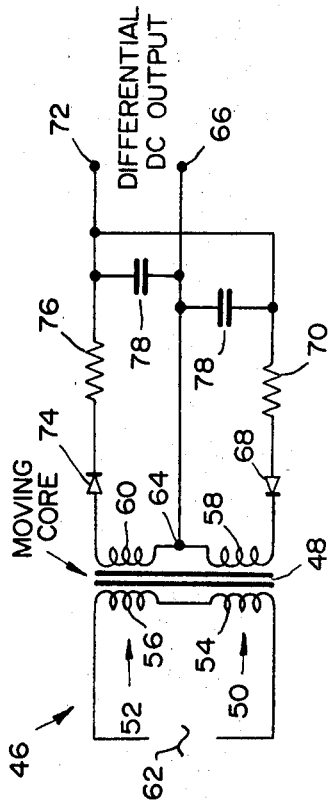
FIG. 12 is a circuit diagram for a differential transformer type of position sensing unit.

Referring now in detail to the drawings and, more particularly, to FIGS. 1 and 2, the reference numeral 20 denotes a precision weighing balance constructed in accordance with and embodying the present invention. In FIG. 1 this balance has been shown in a somewhat schematic form in order to more easily understand the invention. Circuits for the balance are shown in FIGS. 2 and 12 and will be described hereinafter in detail. Moreover, the details of the vertical (lateral support) bearings and of the position sensing unit and damping means, which are schematically shown in FIG. 1, are more fully described and illustrated in detail in following portions of the specifications and in other figures.

The balance 20 (the term herein is used in a derivative sense, i.e., as a mechanism for ascertaining the weight of an object, and not in the classical sense of a poise which determines the measurement of a weight by balancing an object at one end of a horizontal rod pivotally supported intermediate its ends with a known calibrated weight adjacent an opposite end) includes a suitable support 22, for example, in the form of a casing, the lower ends of which include leveling screws 24 in order that certain critical component of the balance, hereinafter described in detail and which will be referred to as a "spindle," may be oriented in a substantially true vertical position with respect to that portion of the earth at which the balance is located.

The support 22 carries a magnet structure 26 in the form of a torus, i.e., a centrally apertured cylindrical yoke having a central hub 28 forming one leg of a U-shaped cross section, the outer leg of which terminates in a retroverted bottom flange 30 that is spaced from the lower end of the hub 28 by an annular gap 32. The structure is formed of a magnetic material and is permanently magnetized so that a concentrated magnetic field of essentially constant magnetic flux bridges the annular gap 32. The "length" of the gap is the dimension parallel to the axis of generation of the torus, i.e., parallel to the length of the bore through the hub.

A spindle 34 extends through the bore in the hub and projects beyond both ends of the magnet structure. The spindle preferably is nonmagnetic and dimensionally stable. In the operation of the balance the spindle is essentially vertical. As shortly will be described, the spindle is guided in an essentially frictionless manner and in the aforesaid axial orientation and, furthermore, in a vertical position with respect to the earth, the vertical position being obtained by leveling the support 22 with the aid of the screws 24 and a level (not shown) fixed to the support 22.

The upper end of the spindle extends through a top vertical bearing 36 and the lower end of the spindle extends through a bottom vertical bearing 38, both bearings being affixed to the magnet structure 26. The bearings are aligned and spaced apart to provide a minimum vertical support over a space of about at least 2″ of the length of the spindle. In a preferred form of the invention the spacing of the top and bottom bearings is about 5″, the prefered form being designed for a weighing range of 0 to about 1500 grams.

The top and bottom vertical bearings are essentially "frictionless" bearings. In FIG. 1 these bearings are schematically illustrated as simple sleeves. In practice it is preferred to employ various sophisticated bearing forms to obtain such "frictionless" supports and these will be described in detail hereinafter. However, the invention broadly embraces the use of an essentially frictionless vertical bearing which extends for over at least 2″ of the lenght of the spindle, this being a bearing which exerts essentially no physical constraint against vertical movement of the spindle, yet maintains the spindle essentially vertical. For example, the clearance between the inner diameter of the bearings and the outer diameter of the spindle is about ±0.003″ so that when the balance is in its operating mode the spindle is free to fall vertically except for the counter balancing electromagnetic force which is obtained in a manner soon to be described.

The balance 20 further includes a weighing pan 40. As shown, this pan is secured to the upper end of the spindle. It is equally within the ambit of the invention to suspend the weighing pan from the bottom of the spindle.

Excess downward movement of the spindle, e.g. when the counterbalancing force means is deactuated, is prevented by suitable stop means as shown in FIG. 1. Said stop means constitutes the bottom surface of a collar pendant from the lower surface of the weight pan and the upper surface of the two vertical bearing 36. In a typical balance the vertical clearance between the collar and the bearing 36 when the balance is in a weighing mode, that is to say, when there is an object on the weighing pan and the balance is activated, is in the order of 0.02″ so that if the balance is deactivated the weighing pan will only fall short distance and will be immediately raised when the balance is activated.

Additionally, the balance includes a force coil 42 which with the magnet structure 26 constitutes a linear magnetic vertically acting force system, that is to say, a force system the response of which is linear over its range of operation and is physically operable on the vertical spindle.

In the embodiment of the balance now being described the force coil is functionally unitary with the vertical spindle 14 and the magnet structure is stationary so that the coil and magnet structure experience relative movement when the balance is activated after being in a deactuatde mode, or when a weight is placed on the pan with the balance in operation. It also is within the scope of the invention to reverse the stationary and movable nature of the magnet structure and the coil, that is to say, the coil may be stationary and, therefore, fixed to the support 22, in which event the magnet structure would be movable and fixed to the spindle 34. However, this alternate structure is not generally preferred. It has the advantage that the electrical connection (leads) to the coil is stationary, but it has the disadvantage that the magnet structure, which is heavier than the weight of the coil and its support, must be suspended electromagnetically. Hence, a greater current flow is required in the coils. This, in turn, leads to larger electric demand, slightly more costly operation and the necessity for dissipating more heat. It also has a slightly deleterious effect on the accuracy of the balance since the moving mass added to the object to be weighed becomes larger so that if there is any error in the system which is proportional to the weight of the moving mass the error in measuring the weight of the object will be greater. The advantage of using stationary leads to the coil is that by not having wires running to a movable coil, regardless of the fineness and limpness of the wires, the spring effect of such wires is avoided. In actual practice where the coil is movable and the magnet structure is stationary, the compliance obtained, as by using lead wires of 0.001″ thick by 0.1″ wide beryllium copper, is so high that no measurable friction or hysteresis ensues.

The force coil consists of several turns of fine wire, for example, 200–400 turns of fine wire. To secure the force coil to the spindle the convolutions thereof are wound about a nonmagnetic coil support 44, i.e., former, in the shape of a cup, the skirt of which extends upwardly into the flux gap where the coil is located. The base of the support has a collar that is tight on the spindle adjacent to the lower end thereof. The clearance between the upper surface of the base of the support and the lower surface of the hub 28 is in the order of 0.02″ so that the support acts as a stop against too extreme an upward movement of the spindle when the balance is activated. It will be observed, incidentally, from these comparatively small top and bottom clearances, that the range of movement of the spindle in its actuated mode is extremely small, being typically, as indicated previously, no greater than about 0.01″ for a maximum movement (displacement) occasioned by a top weight of 1500 grams and correspondingly smaller for lesser weights. Nevertheless, it should be made clear that, although these movements are small, they are definite and necessary because the balance of the present invention operates on the principle of displacement of the spindle under a load and, unlike previous balances, the spindle is not restored to an initial or zero displacement at the time of readout. It soon will be seen that such a small displacement is obtainable by virtue of the high gain (ratio) between the displacement of the spindle and the counterbalancing force applied by the vertically acting electromagnetic force system, this high gain being in part due to the large number of ampere turns of the force coil and in part due to an electronic amplifier soon to be described.

A further element of the balance is a position sensing unit 46. Any type of unit can be employed which is well known to the art and which generates an electrical signal that is a function of the vertical displacement of the spindle 34 under its own weight, the weight of the pan and the weight of the object to be weighed.

By way of example, the position sensing unit may be a differential transformer, which soon will be described, or a variable capacitor, or a differentially variable capacitor, or an electrooptical device.

A variable capacitor constitutes an electrically chargeable element functionally unitary with the spindle and another chargeable element which is fixed relative to the spindle and is in the vicinity of the first element, being separated therefrom by a fluid dielectric. One of the elements is charged and the charge on the other element is read, being a function of the vertical displacement of the spindle. This reading constitutes an electrical output signal.

In a differentially variable capacitor there are either two stationary or two movable elements and one of the other type of element with the relative movement being such that as the one element approaches one of the two elements it moves further away from the second of the two elements. Hence, a differential signal is obtainable.

An electrooptical device may constitute a shutter which variably blocks off a segment of a beam of energy impinging on an energy-responisve cell so that the output from the cell is an electric signal which is a function of the displaced position of the spindle.

A differential transformer is illustrated in FIG. 12. The same includes a movable core 48 which is functionally unitary with the spindle and, hence, experiences the same movement as the spindle. The movable core magnetically couples two transformers 50, 52. One transformer has a primary winding 54 and the other a primary winding 56. The first transformer has a secondary winding 58 and the second transformer a secondary winding 60. The primary windings are connected in series to an AC source 62, e.g., an oscillator. The secondary windings, likewise, are connected in series. The movable core separately magnetically couples the primary and secondary windings of both transformers. As the core moves in one direction, e.g., upwardly, from a neutral position, it lessens the magnetic coupling between the windings of the transformer 50, and as it moves downwardly from a neutral position it lessens the coupling between the windings of the transformer 52. Hence, a differential in output between the secondaries is obtained.

The outputs of the secondaries are connected in a differential circuit. Specifically, the common junction 64 between the two secondary windings is connected to a DC differential output terminal 66. The other end of the winding 58 is connected through a rectifier 68 and resistor 70 to the other differential DC output terminal 72. The other end of the winding 60 is connected through a rectifier 74 and resistor 76 to the same terminal 72. The rectifiers 68 and 74 are oppositely poled so that the output will be a differential output, the DC currents being bucked. Smoothing capacitors 78 are shunted across the polarized rectified outputs from the two secondary windings.

The voltage applied to the force coil as a function of the signal generated in the position sensing unit preferably is a DC voltage, i.e., a substantailly flat DC voltage. A ripple DC voltage also is acceptable, although not preferred. However, the differential transformer shown in FIG. 12 requires an AC input. It will be observed that the rectifiers provide a DC output. If the sensing unit has an AC output from the sensor itself, the sensing unit preferably also includes a rectifier component so that the output from the position sensing device will be DC. The AC input to the position sensing device is supplied by a conventional power line outlet or, for better accuracy, control and regulation, from an oscillator 80 which is fed by a power supply 82.

The DC output from the position sensing unit is amplified by a DC amplifier 84 energized from the power supply 82, and the output from the DC amplifier is fed to the force coil 42, the other terminal of which is connected through an accurate high stability resistor 86 to the power supply.

It is to be understood that it is within the scope of the invention to use a position sensing device which has an AC output and to use with it an AC amplifier instead of a DC amplifier, said AC amplifier having incorporated therein, or there being disposed between the output of the AC amplifier and the input of the force coil a rectifier unit so that ultimately, DC is applied to the force coil.

The combined gain (ratio) between the displacement of the spindle and the force applied by the force coil to the spindle 34 is great, part of the gain being obtained by the number of turns in the force coil (as well as the flux density of the gap 32) and part of the gain being due to the amplification obtained in the amplifier. It will be recalled that the combined gain is so great that the force coil will apply a vertical upward force of 1500 grams for a deflection as small as 0.01" and, in the form of the invention shown, for 0.003".

In a typical balance embodying the invention, the force coil 42 is ¼" long (in the direction of the movement of the spindle) and has 300 turns. It passes 0.35 ampere at 15 volts for a maximum load of 1500 grams. The gap 32 is 0.4" long. The maximum movement of the coil from zero to 1500 grams is 0.003".

An additional element of the balance is an antihunting system, i.e. damping means. It will be apparent that using a servo, i.e. closed, electric/electromagnetic/magnetic loop system such as is being described for the balance 20 and employing "frictionless" vertical bearings must result in oscillation as the system seeks equilibrium at its displaced new level after a weight is placed on the pan or after the balance is activated.

The damping means may constitute dashpots such as air dashpots or oil dashpots, or an eddy current brake. In a balance of the type herein described, an air dashpot would need a very large area piston with extremely fine clearance between the piston and its cooperating cylinder in order to obtain the required degree of damping; and, although an air dashpot could be used, it is not the preferred form of damping. Moreover, such a damping system would be unduly sensitive to air movement.

Oil dashpots are more acceptable and have been used with some success in the balance of the present invention. Nevertheless, in order to obtain the degree of damping necessary for a high gain sysem such as has been described, either a high viscosity oil or a large dashpot is needed, and because all oils do have a friction coefficient they are not an ideal solution to the damping problem. Moreover, it will be appreciated that it is difficult, almost impossible, to retain the oil in the dashpot if the equipment is not maintained in its normal operating position and, hence, the oil must be emptied before shipping and reinstalled in the dashpot after its arrival at its destination and before use.

An eddy current brake, i.e., an electromagnetic damper, which consists of an electrical conductor moving in a strong magnetic field, can also be used. It has the preferable advantage of being truly frictionless and has the further desired characteristic of having a damping factor directly proportional to velocity, that is to say, the damping factor increases with the velocity of movement so that it functions well for critical damping in a short period of time. It is apparent, therefore, that if a very low impedance source is used to drive the force coil, some degree of self-damping will be obtained. Also, if the former 44 constituting the coil support is made of a high conductivity nonmagnetic material such as copper, it will behave as a shorted turn in the magnetic flux field and the eddy currents generated in it upon motion of the spindle will create an opposing force to resist such motion. Nevertheless, even an eddy current brake has not been found to be an optimum form of damping means for the present invention.

Figure 1A:
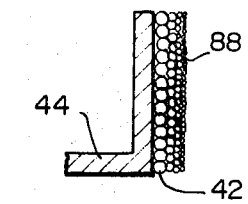
FIG. 1a is a fragmentary sectional view of a balance generally similar to that shown in FIG. 1 and including a velocity coil type of damping means.

Except in the preferred form of the invention, it has been found with the various damping means that if the loop gain in the servo system (force coil and amplifier) is high enough to keep the total movement of the force coil to a few thousandths of an inch, insufficient damping is obtained to prevent oscillation. To obtain the necesssary high-speed critical damping by dashpots and eddy current brakes would necessitate the use of uneconomical and unwieldy equipment. A novel method of obtaining the desired rapid critical electromagnetic damping without unduly increasing the flux in the magnetic gap, indeed, only requiring an increase of a negligible percentage, resides in the use of a velocity coil 88 shown in FIG. 1a and the more sophisticated circuit shown in FIG. 11.

The velocity coil 88 desirably is wound on the same coil support 44 as that used for the force coil 42. Because it is only necessary to develop a very low current level in the velocity coil, the velocity coil can utilize a much finer conductor than the force coil. Typically, the number of turns in the velocity coil is about one-half the number of turns in the force coil, i.e., 100–200 for a 1500-gram balance having a maximum displacement of 0.003". The velocity coil is connected in series with the position sensor and in opposition to the output thereof so that it acts as a feedback coil.

Figure 11:
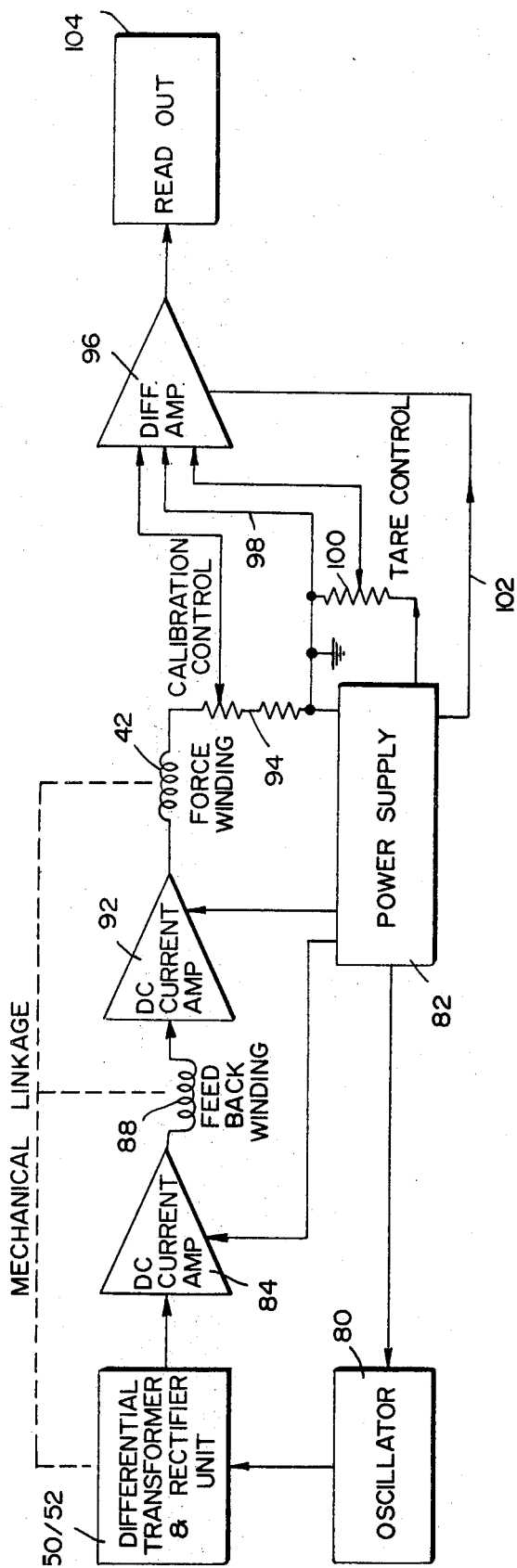
FIG. 11 is a view similar to FIG. 2 of a more sophisticated form of electronic circuit, one employing a velocity coil for damping and also providing calibration and tare control.

In particular, as shown in FIG. 11, the more sophisticated circuit includes the differential transformer and rectifier unit 50/52 supplied with AC current from the oscillator 80 that is energized by the power supply 82. The output from the unit 50/52 is DC and is fed to a DC current amplifier 84 which is a first stage amplifier with a low output impedance. Desirably the first stage amplifier has a low gain, being even as low as in the order of unity. The first-stage amplifier, likewise, is actuated by the power supply 82.

The output from the first-stage DC current amplifier is fed to the velocity coil 88 and the combined output (the output from the sensing unit minus the output from the bucking velocity coil) is fed to a second-stage DC current amplifier 92. The second-stage amplifier has a high input impedance and a high gain. For example, it has a gain of 20 to 200. It will be seen that by having the output impedance of the amplifier 84 low and the input impedance of the amplifier 92 high, the feedback coil will not in any way effect the DC or operational gain of the system; it will, if correctly phased so as to oppose the signal from the unit 50/52, supply a high degree of velocity feedback. Therefore, this small coil in the existing magnetic gap 32 for the force coil will provide as great a damping factor as a very large magnetic structure with an eddy current brake because of the AC gain for the velocity coil in the second-stage amplifier.

The second-stage amplifier is energized from the power supply 82.

The ouput from the second-stage amplifier is fed to the force coil 42, the other terminal of which coil is connected to the power supply 82 through a high stability accurate resistor 94. This resistor is employed for readout purposes and is equivalent to the resistor 86 shown in the circuit of FIG. 2 where it is employed for a similar purpose, to wit, to obtain a voltage drop across the same, the value of which is a function of the current flowing through the force coil and, hence, a function of the weight on the weighing pan. A typical value for the resistor 94 is 10 ohms. For purposes of calibration, i.e. tracking, the resistor 94 is split up into two series connected sections, one of which is a fixed resistor section and the other of which is a variable resistor section. The variable resistor section has its tap connected to a differential amplifier 96. Also connected to the differential amplifier is a grounded lead 98 from the power supply side of the resistor 94.

Another high stability accurate potentiometer 100 is connected between the ground lead 98 and another output from the power supply. The tap from this potentiometer 100 is connected to the differential amplifier.

The potentiometer 100 is of a small value, for example, 3 ohms.

The differential amplifier is energized by a lead 102 from the power supply.

It will be seen that the differential amplifier, thus, is fed a voltage signal which is a function of the current flowing through the force winding and the voltage signal which is a function of the position of the tap for the potentiometer 100. By shifting the tap on the variable section of the resistor 94 the balance is calibrated to take into account, for example, the weight of the weighing pan. By shifting the position of the tap for the potentiometer 100 the operator can adjust the balance to take into account the weight of the container for an object if such a container is used. Hence, the potentiometer 100 functions as a tare control. Because the amplifier 96 is a differential amplifier the composite voltage signal fed to it is a function of the weight of the object in the weighing pan minus the weight of the weighing pan minus the weight of the container for the object.

The output voltage signal from the differential amplifier is in the form of a signal having a value which is a function of all input voltage signals and, therefore, is a function of the true weight of the object on the weighing pan. This signal is fed to an electrical read-out unit 104 which can be of the analogue or digital type.

Mention previously has been made of the "frictionless" top and bottom vertical bearings 36 and 38, which, with respect to FIG. 1 have only been illustrated and described in a general sense. As noted heretofore, these bearings, in addition to covering a minimum 2" vertical span, must operate in a fashion such that, although they provide lateral support, they are essentially frictionless. Four different types of such bearings are set forth below.

Figure 3:
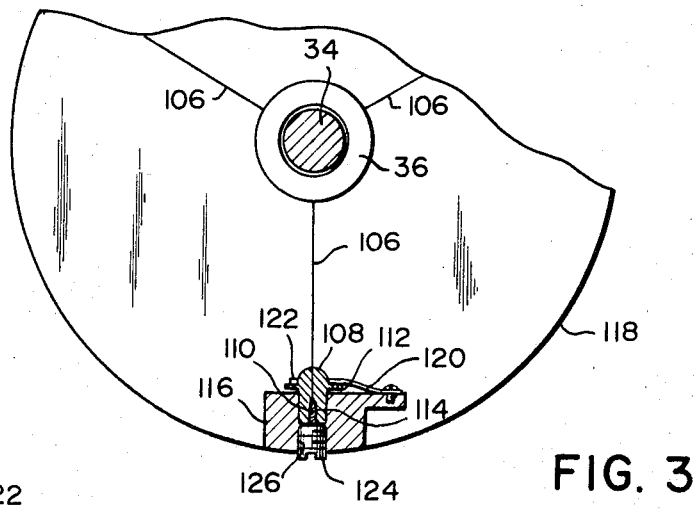
FIG. 3 is an enlarged partially sectional top plan view of a slack cord-type of vertical (lateral support) bearing for the vertical spindle of the balance.
Figure 4:
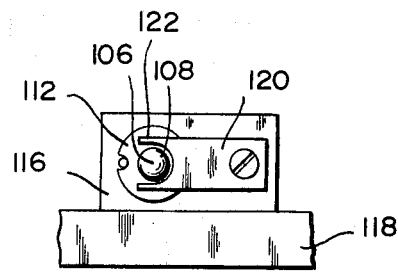
FIG. 4 is an end view of the adjustable support for the outer end of one of the cords of the aforesaid bearing.
Figure 5:
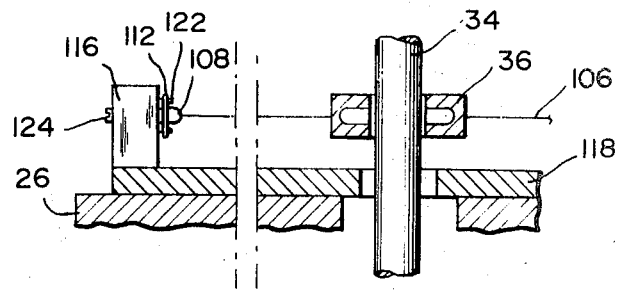
FIG. 5 is a side view of the aforesaid bearing.

The first type of bearing, which conveniently can be referred to as a "flexible cord-type support," is illustrated in FIGS. 3–5. This bearing can be used for each of the top and bottom bearings 36 and 38. That is to say, if a flexible cord-type bearing is used for either one of the bearings, a similar cord-type bearing preferably should be used for the other bearing. It is not generally considered desirable to mix top and bottom bearings of different types, although this is not precluded.

On the basis of certain assumptions which will be mentioned, by proper design and manufacture a virtually frictionless flexible cord-type support can be made to operate over the few thousandths of an inch of movement of the spindle that is needed.

Generally speaking, the flexible cord-type of support constitutes a sleeve through whose central bore the spindle freely passes with a slight yet positive clearance between the spindle and the bore. The sleeve is oriented so that its bore is vertical and the sleeve is supported by radially extending flexible cords which are in an essentially slack state; but the degree of slack is so slight as to only permit very slight lateral movement of the sleeve whereby any slight movement of the sleeve in a direction tending to tauten a given cord will almost immediately place the cord under tension.

The cords must be as flexible as possible, e.g., by making the same of plural strands rather than monofilaments. Preferably, twisted fiber glass is used due to its stability under varying humidity and temperature. Desirably the cords have a low order of resilience and friction. The lengths of the cords should be many orders of magnitude greater than the distance to be deflected. The cords must be of a mechanically stable material, e.g., glass fiber sewing thread. They should be so positioned on the shaft and its outer support assembly that in its normal position (midway between its limits of travel) the cords are at right angles to the spindle so that if infinite tensions were applied to the cords the spindle supports, i.e. sleeves, would take up their normal position which is vertical when the support is leveled.

The cords are denoted by the reference numeral 106. Three cords are used. Fewer cords are not operable. More cords unnecessarily complicate the setting up of the balance. Hence, three cords are preferable. Each cord is anchored at its inner end to the sleeve and each cord extends radially outwardly from the sleeve to a support.

The support is in the form of a cylindrical plug 108 with a central bore through which the outer end of the cord is threaded. The outer tip of the cord has an enlargement such as a knot that is located in a well 110 in the plug. This enlarged end of the cord may be immobilized as by introducing a material which is fluid at a mildly elevated temperature and which is solid at room temperature into the well. A typical such material is sealing wax or paraffin wax. The plug 108 has a flange 112 at its forward end.

Said plug is slidable in a radial bore 114, the axis of which is in a horizontal plane. The bore is formed in a vertical pillar 116 which extends upwardly from a horizontal plate 118 mounted on the upper end of the torus 26 (for the top bearing). A cantilever leaf spring 120 has one end fixed to the pillar 116; the other, i.e., free, end of the spring is bifurcated to form a pair of spaced legs 122 between which the radially inner tip of the plug 108 projects; that is to say, these legs are located on opposite sides of said tip of the plug. The legs press against the flange 112 and force the same toward the pillar.

An adjustment screw 124 is threaded into a tapped bore 126 which is an extension of the bore 114 in which the plug 108 is slidable. By turning the screw the degree of slackness of the affiliated cord 116 can be adjusted. The screws in the three pillars 116 are so set that the sleeve 36 at the upper end of the torus has its bore in vertical alignment with the sleeve 38 at the lower end of the torus, said sleeve likewise being supported by a cord system such as just described. Moreover, this setting of the cords is such that all the cords are very slightly slack. The screws have a very fine pitch to permit this critical adjustment to be effected, which is such that the cords are not required to stretch during normal movement of the support system. The slack in the cords is so adjusted by turning the adjustment screws that about 0.003" of side movement of the spindle can take place before any cords are placed under tension. The adjustment screws are also employed to position the spindle and the force coil in the center of the magnet system.

The springs 120 press the rear ends of the plugs into abutment with the front tips of the adjustment screws. They do not tension the cords. These springs also serve to prevent placing the cords under damaging tension if the shaft is subjected to any abnormal side force. Further protection is obtained by controlling the diameter of the spindle clearance holes in the upper and lower cord supported sleeves 36 and 38 which allows for a radial displacement of approximately 0.004" so that these sleeve bearing surfaces are not in contact with the spindle under normal operating conditions of the balance.

If the spindle is allowed to deviate appreciably from the vertical, some of the cords would always be under tension. Furthermore, the force (weight) acting upon the spindle and force coil would not be equal to the gravitational force. The current needed in the force coil would be a function of cos $\theta$ where $\theta$ is the angle of deviation from the vertical. By providing adjustment means in the current read-out system together with a standard weight for calibration, this error can be compensated. Any change in the angle, such as might be incurred if the unit is moved and not releveled, would necessitate recalibration.

Furthermore, some small change in angle will occur during normal use because of the side play allowed in the suspension system; but due to the very small clearances and slight slack, as described above, that are used in a balance in accordance with the present invention, this small change in angle is so tiny that it can be neglected as will now appear. In a typical structure where the length of the cords is 2″ each from the pillars to the sleeves, where the distance between the upper and lower vertical sleeve bearings is 5″, where the vertical movement of the shaft is ±0.0025″ about the normal, and where the permitted side to side movement of the shaft is ±0.003″ at each support, the angle of deviation will be arc tan $$\frac{0.006}{5} \sim 0.07°$$

The effect of gravitational force of the specimen being weighed would therefore change in the ratio 1: cos 0.07° which is approximately one part in $10^5$.

Figure 6:
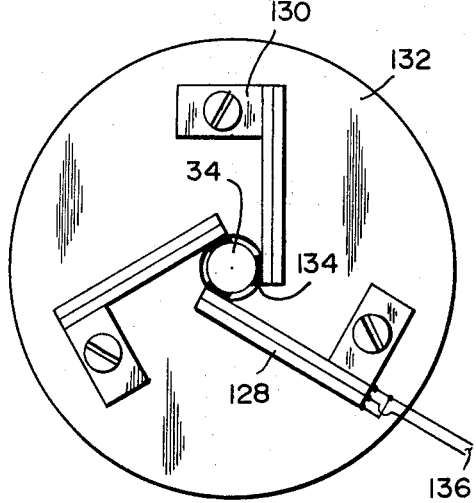
FIG. 6 is a top plan view of a modified form of vertical bearing utilizing plural physically separate bimorphs for rapidly engaging and disengaging an annular external surface of the vertical spindle.

The second type of frictionless bearing which is useful in the practice of the invention is illustrated in FIG. 6. This second type of bearing, as well as the third and fourth types of bearing to be described in detail hereinafter, solve the frictionless bearing problem by holding the spindle in vertical position with a form of mechanical support that can be alternately released and clamped at high frequency. If the velocity of the release mechanism is greater than the radial velocity of the spindle (due to the specimen applying an off-center force), then the whole of the moving system including the spindle, the weighing pan, the force coil and the former, and the velocity coil if employed, will be suspended in free space part of the time, during which time it can move without friction. An additional advantage of this type of grip-and-release bearing support is that during the gripping part, the shaft will be held by the friction constant and this will materially assist in preventing hunting or oscillation of the spindle.

The first form of this grip-and-release support which constitutes the second type of bearing and which can be used to replace the top and bottom bearing sleeves 36 and 38 is, as just noted, shown in FIG. 6 where it is illustrated in top plan view. This second type of support includes three reeds 128 the supports for which are mutually equiangularly spaced. The reeds are electrostrictive bimorphs. Each reed extends from an inner end adjacent the spindle to an outer end where it is cemented to a block 130 that is fixed to a plate 132 attached to either the upper or lower portion of the torus depending on whether the bearing is the upper or lower bearing. The inner end of the bimorph has a bearing 134 cemented to it. The bimorphs are electrically actuated from a source of alternating current 136. This method of vibrating the reeds is preferred to an electromagnetic method which also can be used because electrostrictive operation is more compact and less noisy and also permits higher frequencies.

It will be observed that the inner tips of the bimorphs are approximately tangent to the spindle at equiangularly spaced points, the bearings 134 with their concave inner faces being interposed between such inner tips and the spindle.

The source 136 of alternating current has one lead connected to the conductive film, e.g., electrically conductive epoxy, interposed between the two flat strips of differentially electrostrictive material. The outer faces of the two lengths likewise are coated with electrically conductive films and are connected in parallel to the other terminal of the AC source 136.

All of the bimorphs are actuated in unison so that the bearings 134 will concurrently grip and release the spindle 34. Because the materials composing each strip of the bimorph experience different constrictions on application of the same voltage, the bimorphs will flex when AC current is supplied to them. Preferably, the frequency of oscillation is chosen to coincide with, or is controlled by, the natural frequencies of the bimorphs which are all the same so that a sufficient degree of flexing to grip and release the spindle will take place with a very low electrical input energy.

The resonant frequency of operation is determined by the dimensions of the bimorphs. They can, without difficulty, be suitably dimensioned to operate in the range of 100 Hz. to 10,000 Hz. For a given electrical input the bimorphs that have a lower resonant frequency will have to develop much larger amplitudes to obtain the desired radial velocity than those operating at the higher frequencies. A typical displacement for each of the bimorphs at 10,000 Hz. is about 0.001″.

Figure 7:
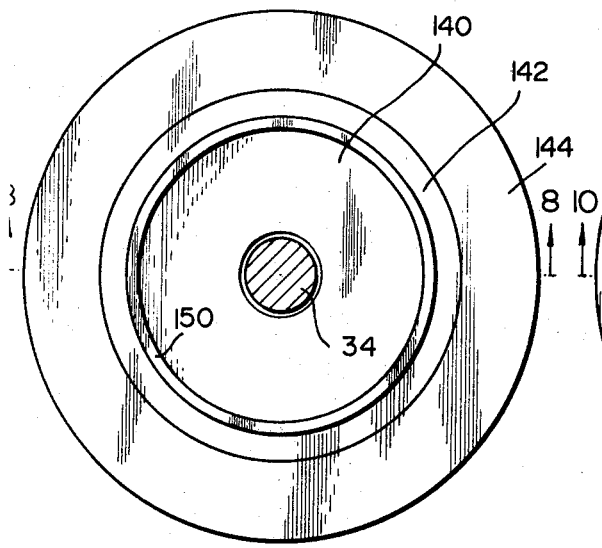
FIG. 7 is a bottom plan view of another modified form of vertical bearing for the vertical spindle, this being one which employ a circular ultrasonic construction.
Figure 8:
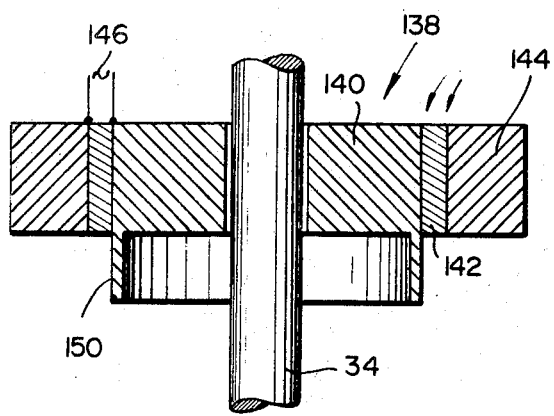
FIG. 8 is a sectional view taken substantially along the line 8—8 of FIG. 7.

The third type 138 of frictionless bearing is shown in FIGS. 7 and 8. This, too, is a grip and release bearing. Essentially it consists of a sleeve-type bearing that is caused to expand and contract at a very high frequency with only small magnitudes of radial movement, thereby obtaining the radial rate necessary to release the spindle 34 and enable the free space condition to be met. Preferably, as previously indicated, where such a bearing is used two similar bearings are employed, one at the top and one at the bottom of the magnet structure. The bearing 138 includes a sleeve 140 made from a material with a low acoustic impedance; aluminum is excellent for this purpose. Surrounding and rigidly joined to the aluminum sleeve is a cylinder 142 made of an electrostrictive material, e.g., lead zirconate. The electrostrictive material of the cylinder is electrically polarized and is coated on its inner and outer peripheries with an electrically conductive film, e.g. an electroconductive epoxy. Surrounding the cylinder 142 is a ring 144 made from a material of relatively high acoustic impedance, e.g. steel, to form a "sandwich" transducer.

Application of an alternating electrical voltage from an AC source 146 to the electrically conductive films, i.e. electrodes, on the inner and outer peripheries of the cylinder 142 will cause the cylinder to radially expand and contract. Such expansion and contraction will be carried through to the aluminum sleeve 140, causing the same to radially expand and contract at its inner periphery. The inner diameter of the sleeve is just slightly larger than the spindle which extends through it so that alternate contraction and expansion of the sleeve will cause the sleeve to alternately grip and release the spindle.

As with the vibrating reed system of FIGS. 4–6, the bearing 138 will have a natural resonant frequency and by supplying a frequency at the AC source to approximate such natural frequency reasonably low power levels can be used to obtain the desired amount of radial movement of the sleeve and a sufficiently speedy radial velocity. The resonant frequency of a typical bearing 138 is between about 20 and 80 kHz.

Figure 9:
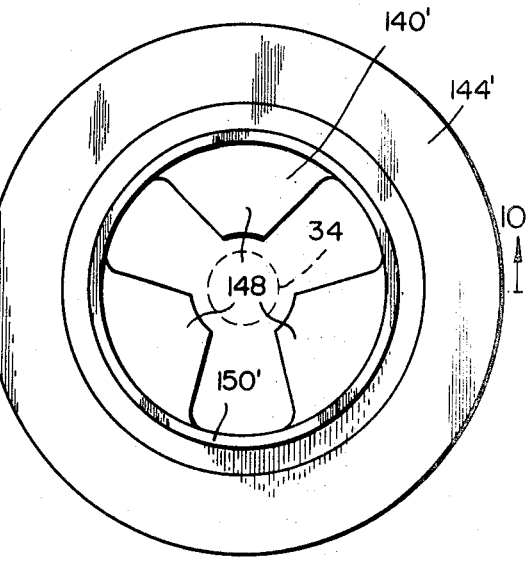
FIG. 9 is a view similar to FIG. 7 of a different type of ultrasonic bearing, one which employs radially inwardly extending horns instead of a circular inner surface such as is used in the bearing of FIG. 7.
Figure 10:
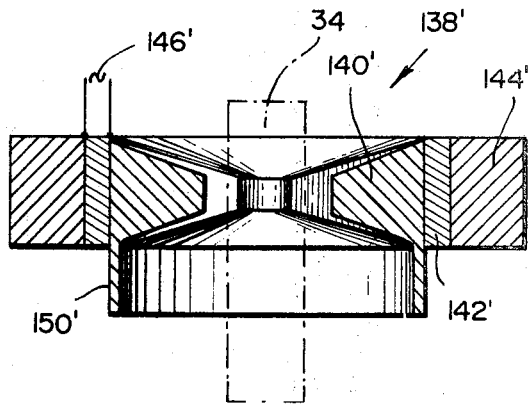
FIG. 10 is a sectional view taken substantially along the line 10—10 of FIG. 9.

If it is desired to obtain still higher amplitudes of expansion and contraction and consequent higher radial velocities, the structure of FIGS. 9 and 10 is useful. This structure is identical to that of FIGS. 7 and 8 except that the inner sleeve 140′ is cut away to form a series of radial inwardly extending horns 148, e.g., three horns, so as to obtain a multipoint suspension, in this instance a three-point suspension. Actually the term "point" is somewhat loosely used because there are three "areas" of suspension, each of which extends over less than ⅓, typically ⅙, of the angular circumference of the spindle 34. These horns will give an amplitude magnification because of their reduced crosssection at the tip which contacts the spindle. Because all of the other structural elements of the bearing shown in FIGS. 9 and 10 are the same as those shown in FIGS. 7 and 8, said elements have been denoted by the same reference numeral with a prime affixed thereto to distinguish between them.

In both forms of bearings shown in FIGS. 7 and 8 and FIGS. 9 and 10, the outer marginal portion of the inner sleeve 140, 140' is provided with a nodal mounting ring 150, 150' which is in one piece with the sleeve 140, 140' and which is used to affix the bearings to the magnet structure.

Attention also is directed to the fact that in the sandwich transducer 138' the horns, in addition to converging in plan as shown in FIG. 9, converge vertically as shown in FIG. 10, the convergence being symmetrical from top to bottom.

It thus will be seen that there is provided a device which achieves the several objects of the invention, and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention, there is claimed as new and desired to be secured by Letters Patent:

1. An electromagnetic balance including a straight spindle, a weighing pan supported by the spindle, an essentially frictionless bearing vertically orienting the spindle and extending over at least 2" of the length of the spindle, a position sensor controlled by the spindle and including means to generate an electric signal which is a function of the vertical displacement of the spindle from an initial position in which the weighing pan is empty, an electronic amplifier having an input and a DC output, circuit means connecting the position sensor to the input of the electronic amplifier so that the displacement signal is supplied to the amplifier, a magnetic vertically acting force system mechanically operable on the vertical spindle and including a force coil and a uniform magnetic field in a vertical gap in which the force coil is relatively movable in a vertical direction, the response of said system being linear over the range of operation of the balance, circuit means connecting the output of the electronic amplifier to said force coil, said amplifier and system having a conjoint high gain so that the total displacement of the spindle with a maximum load on the balance is tiny, being in the order of an amount not exceeding about 0.01" of displacement for a weight of 1500 grams on the weighing pan, said spindle being movable over a distance small enough so that in the operative mode of the balance the force coil in all relative positions thereof cuts the same number of lines of force in the vertical magnetic gap, said bearing providing an essentially fully compliant lateral support for the spindle and there being an essential absence of vertical spring constant effective on the spindle, means to damp vertical oscillations of the spindle, said balance operating by counterbalancing the weight on the weighing pan with a force generated by the linear magnetic vertically acting force system, such counterbalancing force being a function of vertical displacement of the spindle upon the addition of weight to the weighing pan so that the balance operates in the absence of nulling, and means to determine the amount of current flowing in the force coil, said amount of current being a function of weight added to the weighing pan, said last-named means thereby constituting a weight readout.

2. A balance as set forth in claim 1 wherein the damping means is an air dashpot.

3. A balance as set forth in claim 1 wherein the damping means is an oil dashpot.

4. A balance as set forth in claim 1 wherein the damping means is a velocity coil functionally unitary with the spindle and shiftable in a magnetic field, the output from the velocity coil bucking the signal from the position sensor.

5. A balance as set forth in claim 4 wherein the electronic amplifier is subdivided into a first stage and a second stage, the signal from the sensor being fed to the input of the first stage and the force coil being connected in series between the output of the first stage and the input of the second stage.

6. A balance as set forth in claim 5 wherein the first stage has a low gain and the second stage has a high gain.

7. A balance as set forth in claim 5 wherein the first stage has a low output impedance and the second stage has a high input impedance.

8. A balance as set forth in claim 1 wherein the force coil is functionally unitary with the spindle and the magnetic field is stationary.

9. A balance as set forth in claim 8 wherein the magnetic field is provided by a permanent magnet in the configuration of a torus with a vertical central opening through which the spindle extends, said torus having an annular gap concentric with the vertical axis of the spindle and the force coil being located in said gap.

10. A balance as set forth in claim 1 wherein the bearing constitutes a pair of bearings spaced apart at least 2" along the length of the spindle.

11. A balance as set forth in claim 10 wherein there is a slight positive clearance between the spindle and the bearings so that the spindle is guided for vertical movement in a substantially free space.

12. A balance as set forth in claim 1 wherein the bearing is a sleeve and wherein the sleeve is held with its central bore vertical by a flexible cord-type of support, there being a slight positive clearance between the spindle and the bore.

13. A balance as set forth in claim 12 wherein the support includes at least three radially extending flexible cords in an essentially slack state with the degree of slack being slight so that movement of the sleeve of a few thousandths of an inch in a lateral direction will tauten a cord, the inner ends of the cords being connected to the sleeve and the outer ends to fixed members.

14. A balance as set forth in claim 13 wherein the cords are fibreglass.

15. A balance as set forth in claim 14 wherein the cords are twisted fibreglass.

16. A balance as set forth in claim 13 wherein if infinite tension were applied to the cords the central bore of the sleeve would be perpendicular to the lengths of the cords.

17. A balance as set forth in claim 13 wherein means is provided to adjust the slack in the cords.

18. A balance as set forth in claim 13 wherein a spring is included for each cord to oppose inward radial movement of the outer end of the cord.

19. A balance as set forth in claim 1 wherein the bearing is a grip and release bearing.

20. A balance as set forth in claim 19 wherein the grip and release bearing includes plural cantilever supported reeds having ends adapted to engage the spindle and to be flexed away therefrom and means to vibrate the ends of the reeds engaging the spindle.

21. A balance as set forth in claim 20 wherein the reeds are electrostrictive and wherein an AC source is included to induce vibration of the reeds.

22. A balance as set forth in claim 19 wherein the bearing is a sandwich transducer having an inner sleeve surrounding the spindle and spaced therefrom with a slight positive clearance, an electrostrictive cylinder surrounding the inner ring and a backing ring surrounding the electrostrictive cylinder, means being included to supply an alternating potential to the inner and outer peripheries of the electrostrictive cylinder so as to alternately constrict and expand the same and thereby constrict and expand the inner ring into and out of engagement with the spindle.

23. A balance as set forth in claim 22 wherein the inner sleeve has a low acoustic impedance and the backing ring has a high acoustic impedance.

24. A balance as set forth in claim 22 wherein the inner sleeve has a circular inner periphery.

25. A balance as set forth in claim 22 wherein the inner sleeve has gaps in its inner periphery.

26. A balance as set forth in claim 25 wherein the gaps at the inner periphery of the inner sleeve are the tips of horns which extend from bases radially remote from the spindle toward tips at the spindle.

27. A balance as set forth in claim 26 wherein the horns taper toward their tips so as to yield amplitude amplification.

28. A balance as set forth in claim 1 wherein the means to determine the amount of current flowing in the force coil includes an accurate high stability resistor and means to read the voltage drop thereacross.

29. A balance as set forth in claim 1 wherein means is included to level the balance.

30. A balance as set forth in claim 1 wherein means is included to calibrate the balance to take into account the dead weight of the vertically movable portion of the balance exclusive of the weight to be placed in the weighing pan.

31. A balance as set forth in claim 30 wherein means is included to take into account the tare weight of a container placed on the weighing pan for holding a weight.

32. A balance as set forth in claim 1 wherein the position sensor constitutes a differential transformer.

References Cited

UNITED STATES PATENTS

| | | | |
|---|---|---|---|
| 2,685,200 | 8/1954 | Slottow et al. | |
| 2,914,310 | 11/1959 | Bahrs | 177—185 XR |
| 3,107,743 | 10/1963 | Knobel | 177—210 XR |
| 3,186,504 | 6/1965 | Van Wilgen | 177—212 XR |
| 3,360,062 | 12/1967 | Potter | 177—210 XR |

FOREIGN PATENTS 840,639   7/1960   Great Britain.

ROBERT S. WARD, Jr., Primary Examiner

U.S. Cl. X.R.

177—212